US011132228B2

United States Patent
Serrano et al.

(10) Patent No.: US 11,132,228 B2
(45) Date of Patent: Sep. 28, 2021

(54) SMT PROCESSOR TO CREATE A VIRTUAL VECTOR REGISTER FILE FOR A BORROWER THREAD FROM A NUMBER OF DONATED VECTOR REGISTER FILES

(71) Applicant: INTERNATIONAL BUSINESS MACHINES CORPORATION, Armonk, NY (US)

(72) Inventors: Mauricio Serrano, Bronx, NY (US); Giles Frazier, Austin, TX (US); Silvia Melitta Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/927,842

(22) Filed: Mar. 21, 2018

(65) Prior Publication Data
US 2019/0294585 A1 Sep. 26, 2019

(51) Int. Cl.
*G06F 9/50* (2006.01)
*G06F 9/30* (2018.01)
*G06F 15/80* (2006.01)
*G06F 9/38* (2018.01)

(52) U.S. Cl.
CPC ........ *G06F 9/5016* (2013.01); *G06F 9/30036* (2013.01); *G06F 9/30098* (2013.01); *G06F 9/30141* (2013.01); *G06F 9/3887* (2013.01); *G06F 15/8007* (2013.01)

(58) Field of Classification Search
CPC .... G06F 9/30098; G06F 9/50; G06F 15/8007; G06F 9/5016
See application file for complete search history.

(56) References Cited

U.S. PATENT DOCUMENTS

| 6,092,175 | A | * | 7/2000 | Levy | ................... | G06F 9/30076 |
| | | | | | | 712/215 |
| 2004/0268093 | A1 | * | 12/2004 | Samra | ................. | G06F 9/30181 |
| | | | | | | 712/217 |
| 2006/0190946 | A1 | * | 8/2006 | Kissell | .................. | G06F 9/3851 |
| | | | | | | 718/108 |

(Continued)

OTHER PUBLICATIONS

Rooholamin, S.; "Vector Processor Virtualization: Distributed Memory Hierarchy and Simultaneous Multithreading"; Dissertation for Doctor of Philosophy in Electrical Engineering, New Jersey's Science & Technology University; May 2016, 145 pgs.

(Continued)

*Primary Examiner* — David J. Huisman
(74) *Attorney, Agent, or Firm* — Intelletek Law Group, PLLC; Gabriel Daniel, Esq.

(57) ABSTRACT

A computing device and a method of allocating vector register files in a simultaneously-multithreaded (SMT) processor core are provided. A request for a first number (M) of vector register files is received from a borrower thread of the processor core. One or more available donor threads of the processor core are identified. A second number (N) of the vector register files, of the identified one or more available donor threads, are assigned to the borrower thread, where N is ≤M. The borrower thread is parameterized to create a virtualized vector register file for the borrower thread, based on a width of the N vector register files of the identified one or more donor threads.

18 Claims, 7 Drawing Sheets

(56) References Cited

U.S. PATENT DOCUMENTS

| | | | |
|---|---|---|---|
| 2010/0161948 A1 | 6/2010 | Abdallah | |
| 2011/0072438 A1* | 3/2011 | Fiyak | G06F 9/3012 |
| | | | 718/104 |
| 2011/0296428 A1* | 12/2011 | Rawson, III | G06F 9/30098 |
| | | | 718/104 |
| 2012/0216004 A1* | 8/2012 | Abernathy | G06F 9/30123 |
| | | | 711/165 |
| 2017/0242699 A1 | 8/2017 | Caprioli | |
| 2017/0371654 A1* | 12/2017 | Bajic | G06F 9/3012 |
| 2018/0239604 A1* | 8/2018 | Cain, III | G06F 9/30098 |

OTHER PUBLICATIONS

Mericas, A.; "Performance Characteristics of the POWER8 Processor"; IBM Corporation; IBM Systems & Technology Group Development, 2014; 26 pgs.

Anonymously; "A Method and System for Computing a Single Thread Performance in a Simultaneous Multithreading Environment"; http://ip.com/IPCOM/000237737D; Jul. 8, 2014, 3 pgs.

Anonymously; "Speculative Resource Allocation in Asynchronous Simultaneous Multithreading Computing Instruction Streams"; http://ip.com/IPCOM/000235936D; Mar. 31, 2014, 6pgs.

Anonymously; "System and Method for Achieving Out-of-Order Execution of Instructions in Simultaneously-Multithreaded (SMT) Processor Cores"; http://ip.com/IPCOM/000199883D; Sep. 20, 2010, 6pgs.

Anonymously; "Method and System for Implementing "Register Threads" in a Simultaneously-Multithreaded (SMT) Processor Core"; http://ip.com/IPCOM/000199825D; Sep. 17, 2010, 5pgs.

* cited by examiner

SMT PROCESSOR TO CREATE A VIRTUAL VECTOR REGISTER FILE FOR A BORROWER THREAD FROM A NUMBER OF DONATED VECTOR REGISTER FILES

BACKGROUND

Technical Field

The present disclosure generally relates to improved processor core designs, and more particularly, to support of wide single instruction multiple data (SIMD) register vectors through a virtualization of multithreaded vectors in a simultaneous multithreaded (SMT) architecture.

Description of the Related Art

Today, there are various computing architectures that improve data processing efficiency. Processors often use simultaneous multithreading (SMT), which improves the efficiency of the processors by way of hardware multithreading. SMT permits multiple independent threads of execution to better utilize the resources provided by modern processor architectures. Another technique used is single instruction, multiple data (SIMD), which includes multiple processing elements that perform the same operation on multiple data points simultaneously. SIMD provides parallel computations on a single process (i.e., instruction), while in SIMT, instructions of several threads are run in parallel.

SUMMARY

According to one embodiment a method of allocating vector register files in a simultaneously-multithreaded (SMT) processor core are provided. A request for a first number (M) of vector register files is received from a borrower thread of the processor core. One or more available donor threads of the processor core are identified. A second number (N) of the vector register files, of the identified one or more available donor threads, are assigned to the borrower thread, where N is <M. The borrower thread is parameterized to create a virtualized vector register file for the borrower thread, based on a width of the N vector register files of the identified one or more donor threads.

In one embodiment, identifying one or more available donor threads of the processor core includes determining, for each thread other than the borrower thread, whether the thread has an SMT mode OFF and/or is not using its vector register file.

In one embodiment, at least one of the one or more donor threads is limited to software emulation mode. This software emulation mode includes performing floating-point operations that do not involve a vector register file.

In one embodiment, at least one of the M requested vector register files is for a K number of vector registers of a total of L vector registers of the at least one of the M requested vector register files, where K<L.

According to one embodiment, a simultaneously-multithreaded (SMT) processor core is provided. The processor core includes a plurality of threads and a vector register file assigned to each thread. There is a controller that is configured to receive, from a borrower thread of the plurality of threads, a request for a first number (M) of the vector register files. The controller is configured to identify one or more available donor threads of the plurality of threads. Further, it is configured to assign a second number (N) of the vector register files, of the identified one or more available donor threads, to the borrower thread, where N is ≤M. It parameterizes the borrower thread to create a virtualized vector register file for the borrower thread, based on a width of the N vector register files of the identified one or more donor threads.

In one embodiment, identifying one or more available donor threads of the processor core includes determining, for each thread other than the borrower thread, whether the thread has an SMT mode suspended and/or is not using its vector register file.

In one embodiment, at least one of the one or more donor threads is limited to software emulation mode. This software emulation mode includes performing floating-point operations that do not involve a vector register file.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
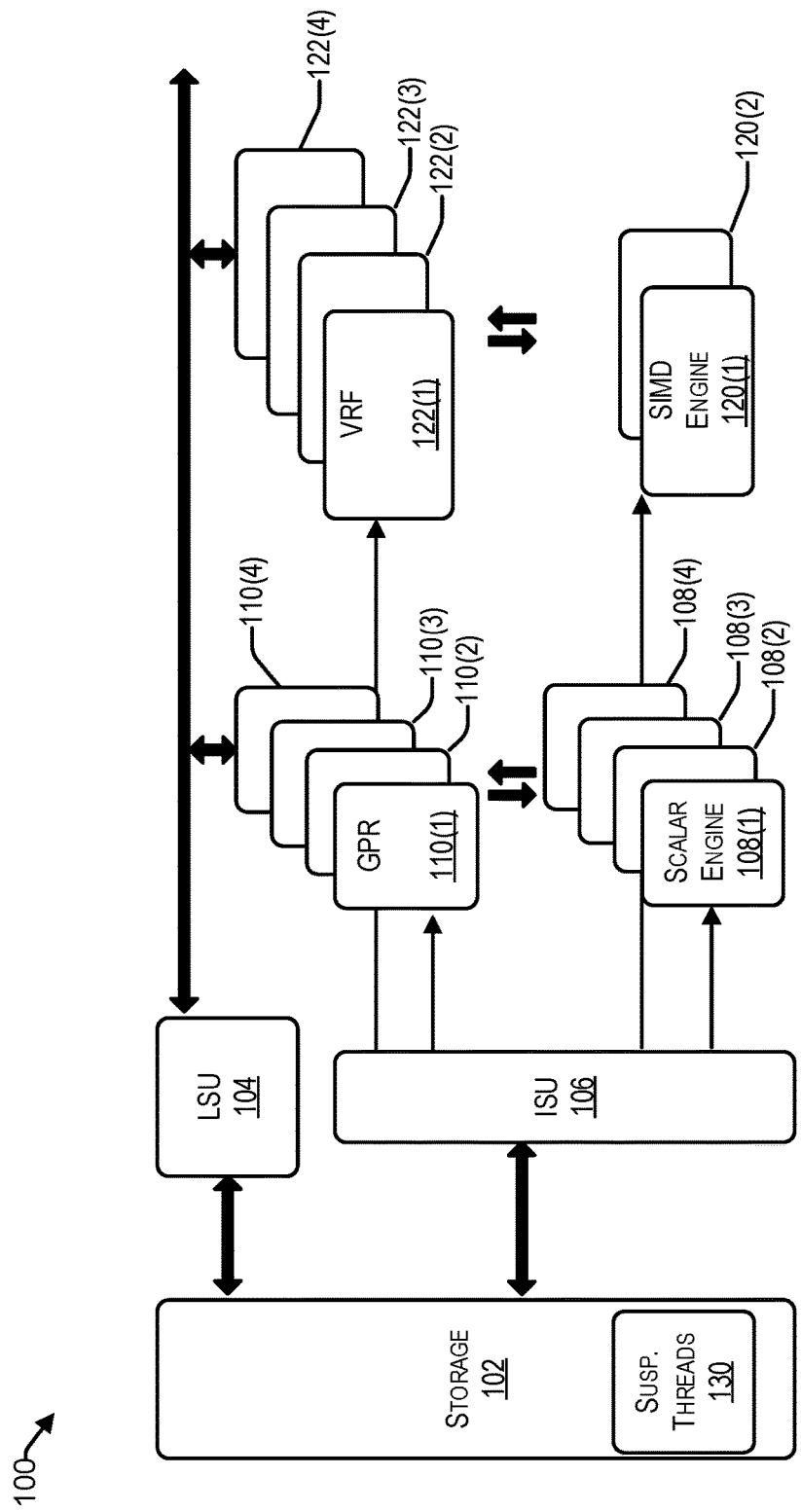
FIG. 1 illustrates an example architecture of a processor core having multiple threads.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Simultaneous multithreaded (SMT) architectures allow several hardware threads to run concurrently, by switching resources, such as functional units, among multiple threads. SMT involves keeping the context of each thread in hardware, such as vector register files. As used herein, a thread is the smallest sequence of programmed instructions that can be managed independently by a scheduler of a processor core. SMT permits multiple independent threads of execution to better utilize the resources provided by modern processor architectures. For example, SMT8 includes eight copies of vector register files.

Another popular technique is single instruction, multiple data (SIMD), which includes multiple processing elements that perform the same operation on multiple data points simultaneously. SIMD provides parallel computations on a single process (i.e., instruction). SIMD involves specialized vector register files for these instructions. Vector registers are typically substantially bigger and wider than normal (e.g., scalar) register files for scalar operations (e.g., integer and floating-point), and typically range from 128-bits per register to 512-bits per register in some architectures, thereby consuming a significant amount of chip real estate. There is one dedicated vector register file per SMT thread.

In many scenarios, it is desirable to have a large size for vector register files to achieve more SIMD parallelism, and hence, computing efficiency. However, increasing the vector register file size, increases the chip real estate and power consumption. These issues are exacerbated when both SMT and SIMD are supported simultaneously.

Accordingly, what is disclosed herein are methods and system of supporting wide (large) vector register files for SIMD while controlling the vector register file size to support SMT. A request for a first number (M) of vector register files is received from a borrower thread of the processor core. One or more available donor threads of the processor core are identified. A second number (N) of the vector register files, of the identified one or more available donor threads, are assigned to the borrower thread, where N is <M. The borrower thread is parameterized to create a virtualized vector register file for the borrower thread, based on a width of the N vector register files of the identified one or more donor threads.

By virtue of the concepts discussed herein, the borrower thread can issue virtual SIMD instructions that are interpreted as operating on an N times wider vector register file. Such improvement in performance is achieved while the physical register size, and hence the chip real estate, is not increased. Reference now is made in detail to the examples illustrated in the accompanying drawings and discussed below.

FIG. 1 illustrates an example architecture 100 of a processor core having multiple threads. By way of demonstrative example only, and not by way of limitation, an SMT4 architecture is described, while it will be understood that other architectures are supported as well. Architecture 100 may include a storage device 102, a load store unit (LSU) 104, an instruction sequencing unit (ISU) 106, one or more scalar engines (e.g., 108(1) to 108(4)), one or more general purpose registers (GPRs) (i.e., one per thread, and thus, four for SMT4—110(1) to 110(4)), one or more single instruction, multiple data (SIMD) engines (e.g., 120(1) to 120(2)), and one or more vector register files (VRFs) (i.e., four VRFs for SMT4—122(1) to 122(4)).

The storage device 102 represents machine readable medium, such as cache, that can communicate with the LSU 104 and ISU 106. In various embodiments, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the social network method, etc., shown in the drawings. Volatile storage media include dynamic memory, such as main memory of such a computer architecture. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions of the processor for execution. In one embodiment, the storage device 102 includes execution threads that have been suspended 130. In the example of FIG. 1, four threads are active in the core, whereas additional threads are suspended 130 in the storage device 102. The number of GPR 110(1) to 110(4) and VRF (108(1) to 108(4)) instances indicate the maximum number of active simultaneous threads. The ISU 106 also has information about what SMT mode it is in (e.g., 1 thread, 2, 4).

The LSU 104 is a specialized execution unit that is operative for executing "load" and "store" instructions, generating virtualized addresses of load and store operations, and loading data from memory, including storage device 102, GPR 110(1) to 110(4) and VRF 122(1) to 122(4). Thus, the LSU can read data from the GPR 110(1) to 110(4) and/or VRF 122(1) to 122(4) and store it in the storage device 102.

The ISU 106 is responsible for organizing program instructions to be fetched from the storage device 102, and executed, in an appropriate sequence. It is part of a control unit of a central processing unit (CPU). The ISU 106 is coupled between the storage device 102 and the GPR 110(1) to 110(4), the scalar engine(s) 108(1) to 108(4), the SIMD engines 120(1) to 120(2) and the VRFs 122(1) to 122(4).

Each scalar engine 108(1) to 108(4) represents a scalar execution unit that is configured to process one datum at a time, with typical data items including integers or floating-point numbers. The GPRs 110(1) to 110(4) represent a set of registers, wherein each register is associated with a given thread.

The SIMD engines 120(1) to 120(2) provide parallel computations on a single process (i.e., instruction). Each SMT thread has a corresponding VRF. There is one vector register file per SMT thread. Unlike conventional computing architectures, where there is a fixed correspondence between a GPR and VRF (e.g., 110(1) with 122(1) and 110(1) with 122(1)) the teachings herein allow an SMT thread, referred to herein as a borrower thread, to borrow another thread's SIMD vector register file, referred to herein as a donor thread. Accordingly, the borrower thread can perform SIMD operations on a wider VRFs. In this way, an elastic architecture is provided, where VRF resources (e.g., 122(1) to 122(4)) can be shared in various permutations, thereby allowing a more efficient processing of data without any substantial increase in hardware.

It should be noted that while four instances of GPR (110(1) to 110(4)) and VRF (122(1) to 122(4) (that corresponds to the number of threads) and also four instances of the scalar engines (108(2) to 108(4)) are depicted in FIG. 1 by way of example, the number of scalar engines does not have to be the same as the GPR/VRF. The GPR and VRF do have the same number of instances (i.e., which equals the maximum number SMT threads). However, the number of scalar engines and the number of vector engines is defined by the capability of the ISU 106 (e.g., how many different instructions of a given type it can start). Thus, the number of scalar engines could have been another number, such as six.

For example, an operating system of the architecture 100, which may be stored in the storage device 102, may receive a request from an SMT thread indicating that it would benefit from one or more additional vector register files (beyond the one dedicated to it). To that end, the subject thread enters a virtualized mode, which allows it to borrow one or more VRFs. In various embodiments, a thread may be available as a donor thread for a borrower thread if (i) the SMT mode is OFF for the thread at the time of the inquiry from the borrower thread (e.g., in the processor that particular SMT slot has no active thread), or (ii) the thread is not using its dedicated register (i.e., VRF).

When in donor mode (e.g., the VRF of a donating thread is at least temporarily provided to a borrower thread), in one embodiment, the operating system can limit the donor thread to perform SIMD operations through a software emulation mode, which does not require a VRF. In this way, the donor thread can continue processing data in software emulation mode, while offering its VRF to the borrower thread. Being in software emulation mode typically does not significantly degrade the performance of the donor thread, to the extent it is limited in duration. However, software emulation mode could degrade performance when SIMD instructions are frequent, and donation is over longer periods of time. Accordingly, in one embodiment, the operating system calculates the amount of time T a donor thread operates in software emulation mode. If this time is above a predetermined threshold, its corresponding VRF is reclaimed, or the thread could be suspended until its VRF is reclaimed, discussed in more detail later. An example pseudo code used by the controller to decide whether to take corrective action for a borrower thread is provided below:

---
Install the donor thread (DT) in software emulation (SE);
Allocate performance counters for the DT, start running DT;
Let PR_NE be the performance counters for non-emulation mode;
Let PR_EM be the performance counters for emulation mode;
IF (PR_EM/PR_NE > threshold) performance corrective action.
---

For example, the pseudo code above can be used dynamically by the controller to decide a course of action to take when a donor thread attempts to access a VRF that is currently borrowed by another thread. The donor thread enters a software emulation (SE) mode, and hardware performance counters are initialized. A performance metric, such as instructions/second, is computed for each donor thread. Subsequently, the same process is executed in non-emulation mode. The process may be performed continuously. In one embodiment, if the ratio of overhead in SE mode compared to non-SE mode exceeds a threshold, a corrective action can be taken (such as restoring the VR's to the owner (i.e., donor) thread and suspending the borrower thread) to ensure that the donor thread does not experience significant degradation in performance.

As used herein, overhead refers to how many additional instructions are needed. For example, when we emulate a 128 b wide SIMD with 32 b wide elements, it means the 128 b vector holds 4×32 b elements. It can take in emulation mode 4× the number of instructions to execute the SIMD instruction. If 25% of the instructions are SIMD 4×32 b and the other 75% are scalar, a rough estimate of the overhead is: non-SE mode 100%, SE mode 4*25%+75%=175%. This ratio would be 175/100=1.75. This is only a rough estimate provided by way of example, since modern processors can start multiple instructions per cycle.

If the SIMD instructions operate on 8 b elements (i.e., 16×8 b, then the overhead can become larger. With the same 25%/75% split, SE gets 25%*16+75%=475% and the ratio is 475/100=4.75

In an alternative embodiment, a dynamic profiling operation is performed at an earlier time to make a decision for a future time. As used herein, "at an earlier time" includes the meaning of not done while running the application. For example, the information can be gathered when compiling the application, or when the application is written. Alternatively, the information gathering could be triggered by the operating system to check the nature of its most frequent running applications. In one embodiment, the information gathering could also be triggered by the system administrator.

If it is determined that the SE mode does not impact the application performance by a predetermined threshold, then the application is marked as "Software-Emulation Friendly" and there is no need to perform any dynamic profiling operation.

Profiling can be performed on an application level (e.g., a Java program or a Cobol program). For example, the process of profiling may include going through the code and checking (i) whether any SIMD instructions are used (i.e., if no, this is a good candidate that its threads can donate VRFs), (ii) how frequent the SIMD instructions are, compared to the scalar ones, and how many operations there would be to emulate them. In one embodiment, profiling would further include determining what the expected penalty would be when executed in SE mode.

In one embodiment, a subject (i.e., borrower) thread can transition to a virtualized mode by determining, by the thread, that it would benefit from additional registers from the VRF pool (e.g., 122(1) to 122(4)) to perform its computation. The request for the additional registers may be sent to a higher authority in the architecture 100, such as the operating system or a hypervisor, collectively referred to herein as a "controller," by using a system call, discussed in more detail later. In one embodiment, the request includes a number M of vector register files (VRFs) of SIMD engines that the subject thread has deemed would be appropriate for performing its calculation time efficiently. At this stage, the subject thread transitions into a virtualized mode. An example operating system call that includes a request for additional resources is described below:

VVECON RESULT=M, EXACTM

In the example code above, the VVECON represents the operating system call. The variable M represents the number of vector register files requested, where 1≤M≤4, for the four-way SMT example of FIG. 1. The variable M is the total width of the vector register, which includes its dedicated vector register file plus any additional ones (M−1) it would like. The expression RESULT is a pointer to the number of allocated vector register files that are allocated to the borrower thread, which is returned by the controller to the borrower thread, where 1≤*RESULT≤M, and * is a memory reference.

The expression EXACTM represents a failure state that is returned to the borrower thread if an M number of vector register files cannot be allocated. For example, the HCALL returns a failure response by setting RESULT to 0. However, if HCALL succeeds, the response to the HCALL returns the number of vector register files that are granted in the location pointed by RESULT. In one embodiment, the EXACTM failure state is not asserted if the borrower thread receives any additional vector register file, even if the number is below M.

In response to the request for the additional resources from the subject thread (e.g., 120(1)), the controller identifies threads that are available to function as donors of vector register files (e.g., VRF 122(2) to 122(4)) and which SIMD engines should be chained together to provide the extra wide SIMD engine. As described above, a thread may be available as a donor thread for a borrower thread if (i) the SMT mode is OFF for the thread at the time of the request from the borrower thread (e.g., in the processor that particular SMT slot has no active thread), or (ii) the thread (e.g., SIMD 120(2)) is not using its dedicated register (e.g., VRF 122(2) to 122(4), respectively. The actual number of SIMD vector register files available N may be more or fewer than the number M requested (i.e., from 1, representing the dedicated register (i.e., VRF 122(1) in this example), to the total number of vector register files on the architecture 100 (i.e., four in the present example)). However, the number of vector register files N that are allocated to the borrower thread does not exceed M.

Accordingly, the VVECON instruction above causes the controller to examine the state of the SMT threads in a CPU. This operation iterates over the SIMD vector register files of the available SMT threads until a partial or complete request has been fulfilled according to the VVECON request. The result of the VVECON request reflects the actual number of SIMD registers transferred to the calling thread (which could be less than the requested). The controller may limit the number of granted registers by (i) the number of available VRFs and (ii) by the maximum width of the SIMD execution units. The controller returns the smaller of the two numbers.

Thus, upon determining the available SIMD vector register files, the controller assigns N (i.e., up to M) of these vector register files to the subject thread, which now is deemed a borrower thread. In one embodiment, the one or more donor threads enter a special status that prevents them from accessing their SIMD vector register files, referred to herein as a scalar-only mode. In one embodiment, the scalar-only mode is maintained for the donor thread(s) until the borrower thread completes its computation.

The borrower thread (e.g., SIMD 120(1) in the present example), also enters a virtualized mode, which allows it issue instructions to a wider SIMD register width, which is N times the original width, where N is the number of vector register files made available by the controller. In one embodiment, when the controller returns N=full width, then the controller does not need to know what the original/base SIMD width is. In another embodiment, where the controller returns N as a multiple of the base width, then the controller first determines what the base width is, which can differ from one processor to the next.

Accordingly, instructions of the borrower SIMD (e.g., 120(1)) are interpreted to operate on wider registers, thereby improving the computational efficiency of the borrower thread, without additional chip real estate. Example pseudo code for the usage of a parameterized SIMD algorithm using an already allocated RESULT from a previous step is provided below.

(i)    char A[vsize], B[vsize], C[vsize]; vector type
(ii)   VRFs = LOCK(RESULT)
(iii)  for (i=0; i< vsize; i = i + VRFs*sizeof(vector))
       *((vector *)&A[i]) = *((vector *)&B[i]) + *((vector *)&C[i]);
(iv)  Unlock(RESULT)

The pseudo code above is an example of a parameterized SIMD algorithm that uses the RESULT returned by the VVECON call discussed previously. Initially, the borrower thread allocates a number of registers using the VVECON call. By way of example, the first line of the pseudo code above includes three character arrays A, B, C, each having a size indicated by the variable vsize" allocated to a borrower thread. In the example above, it is desired to perform the vector operation A=B+C for a particular element type (float, double, etc.) using vector SIMD operations. The vector is a type for the operation desired. For example, "vector float" for a 128-bit SIMD architecture is a 128-bit register that includes four floating point numbers.

The second line of the pseudo code above "locks" the shared variable pointing to RESULT allocated by VVECON. The lock operation returns the present number of VRFs (which could be less than the original N requested by the borrower thread), which prevents the borrower thread from being downgraded in the number of borrowed VRFs, until the SIMD operation is finished.

In the third line of the pseudo code above, the number of iterations is scaled by the size of the original vector register file and the number of allocated VRFs for borrowing. It is assumed that vsize is a multiple of the size of the VRFs multiplied by the number of allocated VRFs. In one embodiment, if vsize is not a multiple of the size of the VRFs multiplied by the number of allocated VRFs, an extra compensation code can be run for the remaining iterations (not shown here to avoid clutter). The compensation code is configured to add additional loops (e.g., iterations) when the number of iterations in a loop is less than an unroll factor. In the second part of the third line of the pseudo code above, the operation size is scaled by the hardware according to the number of allocated VRFs.

Finally, in line 4, the RESULT is unlocked. After this operation is concluded, it is safe for the controller to downgrade the number of VRFs (if appropriate). Thus, downgrade/upgrade operations can occur while the borrower thread is still running (i.e., before the borrower thread completes its operation).

In one embodiment, after virtualized mode is entered and the borrower thread has access to wider SIMD vector register files, some operations continue to use existing SIMD instructions without modification while other operations involve new instructions configured for wider registers, thereby taking advantage of the additional vector register files borrowed. For example, existing "load" and "store" SIMD instructions in the borrower thread may be interpreted so as to "load" and "store" more elements, depending on the virtual register file size. Other instructions, such as instructions that operate on elements within a register, may either be reinterpreted or replaced by other instructions that operate on more elements (i.e., vector register files). Thus, the borrower thread uses the new instruction set whenever it is in the virtualized mode.

In one embodiment, while the borrower thread is in this virtualized mode, the controller monitors the donor threads to check for violations of the virtualized mode. For example, a donor thread whose SIMD vector register file is provided to a borrower thread and attempts to perform an SIMD operation is suspended and remedial action is performed to prevent computational conflict. For example, the controller may (i) keep the offending donor thread suspended (i.e., inactive), (ii) force the donor thread into a software emulation mode, or (iii) suspend the borrower thread, thereby preventing any potential conflict.

The borrower thread can exit the virtualized mode in various ways. In one embodiment, upon completing its computation, sometimes referred to herein as its operation, the borrower thread can exit the virtualized mode. To that end, the borrower thread sends an instruction to the controller indicating that it no longer needs the one or more vector register files of the donor thread. For example, the virtualized mode can be exited with a special system call, namely a virtual vector mode off (VVECOFF), which restores the borrowed vector register files to the corresponding donor threads and switches the architecture 100 to interpret SIMD instructions normally (i.e. so as to apply to registers of the original width).

Accordingly, the controller then facilitates the restoration of the borrowed vector register files to the donor threads. Further, any restrictions that may have been placed on the donor thread are vacated. Such downgrade of the borrower thread may be performed at a time that is deemed safe by the controller. For example, the downgrade can be performed when the borrowed VRF is not being used by the borrower thread.

In other embodiments, the controller may initiate the borrower thread to exit the virtualized mode and restore the borrowed vector register files to the donor threads if a threshold time is exceeded and/or the donor thread requests the borrower thread to release the borrowed vector register file. The controller can also monitor donor threads for the amount of time that the donor thread is in software emulation mode, at predetermined intervals or upon a trigger event. If this time is above a predetermined threshold, the controller facilitates the borrower thread to release the borrowed vector register file (e.g., VRF 122(2)) back to the donor thread (e.g., SIMD engine 120(2)).

It should be noted that a release of a vector register file by a borrower thread does not necessarily end its virtualized mode. For example, the borrower thread may be borrowing from several threads. Even if the vector register file of one donor thread is restored, other borrowed vector register files may still be retained and used in virtualized mode.

In one embodiment, upon determining that a donor thread is attempting to access its vector register file, the controller can compare priorities of both threads (i.e., donor vs. borrower) to determine whether the borrowed vector register file should be restored. upon determining that the priority of the donor thread is higher than the borrower thread, the borrowed vector register files are restored to the donor thread. However, upon determining that the priority of the donor thread is the same or lower than the borrower thread, the donor thread is forced into a software emulation mode or simply suspended to avoid conflict.

In one embodiment, whether a borrower thread can borrow a vector register file from another thread is based on the relative priority, time constraints, and/or computational load of the thread. For example, the controller can determine the priority and/or the computational load of the requestor (borrower) thread. The controller then finds a thread that presently has the lowest priority and/or computational load. Generally, a thread that has its SMT mode OFF or is not using its VRF has the lowest priority. However, even if a thread is presently using its VRF, it can still be compelled to release its VRF to the borrower thread, thereby becoming a donor thread, if its thread is deemed to have a lower priority than the borrower thread and/or has a relatively low computational load. If the computational load of the borrower thread is within a threshold range of the other threads, then the vector register files of the other threads are not released to the borrower thread. Similarly, if the priority of the borrower thread is within a threshold range of the other threads, then the vector register files of the other threads are not released to the borrower thread.

In one embodiment, the semantics of non-SIMD instructions under virtualized mode are substantially similar to the non-virtualized mode (i.e. instructions not involving a VRF, or writing to a GPR using the borrower thread's GPR). Thus, branch instructions, load/stores not involving a VRF, and other operations remain the same.

As mentioned before, once this virtualized mode is entered, the semantics of the SIMD instructions using a VRF are modified. For example, the SIMD operation originally performing the function $RT[i]=RA[i]+RB[i]$, $i=0, 1, 2, 3$ and operating on four elements stored in SIMD registers VRT, VRA and VRB, may be extended to operate on more than four elements. If the number of granted VRFs is four, then the operation will operate on 16 elements instead of four: $RT[i]=RA[i]+RB[i]$, $i=0, 1 \ldots 15$.

Vector load operations can also operate in a similar way, but the effective address is spread to include consecutive memory locations. For example, the vector load command VLOAD VRT,EA are translated into four vector loads with effective addresses (EA) set to: $EA, EA+1*16, EA+2*16, EA+3*16$, assuming that the size of the vector is 16 bytes. Accordingly, the VRT is then interpreted as a 64-byte vector register target, using four borrowed VRFs.

In one embodiment, other operations involve new instructions, such as instructions that permute elements within a vector. These new instructions may be available only in virtualized mode.

In one embodiment, while in virtualized mode, SIMD instructions are decomposed into smaller SIMD operations (e.g., one for each of the VRFs involved). If the decomposed operations are synchronized (executed in sync-step), then all the operations are executed at the same time. If an exception occurs in one of the operations (for example, a divide by zero or some denormalization exception), then the first element where the exception occurred can be readily reported. An exception handling software can then take an appropriate action based on the address of the instruction causing the exception. However, if the decomposed operations are not executed in sync-step, then the processor will commit instructions up to the point of the excepting instruction. Thus, the exception address is reported to software for the instruction where the first exception occurred, thereby making recovery possible.

With the foregoing overview of an example architecture of a processor core having multiple threads, it may be helpful to discuss different example granularities of sharing between donor threads and borrower threads. To that end, FIGS. 2A to 4 provide different example sharing granularities. By way of example only, and not by way of limitation, an SMT4 architecture is described, similar to that of FIG. 1, while it will be understood that other architectures are supported as well.

Figure 2A:
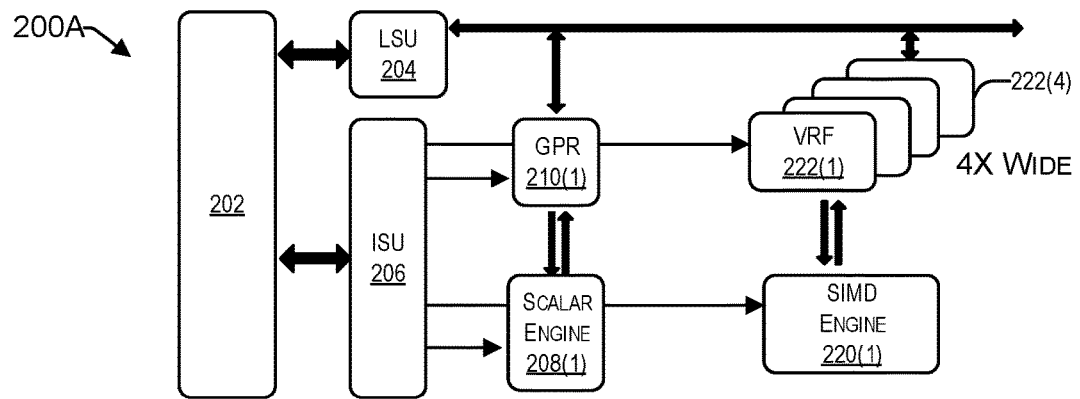
FIGS. 2A to 2D illustrate a sharing scenario where one thread is a borrower thread and the other threads only have scalar registers when in donor mode, consistent with an illustrative embodiment.
Figure 2B:
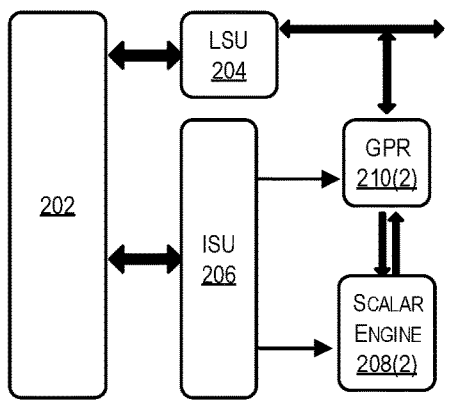
Figure 2C:
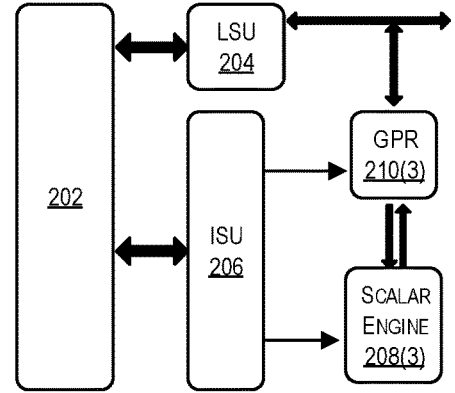
Figure 2D:
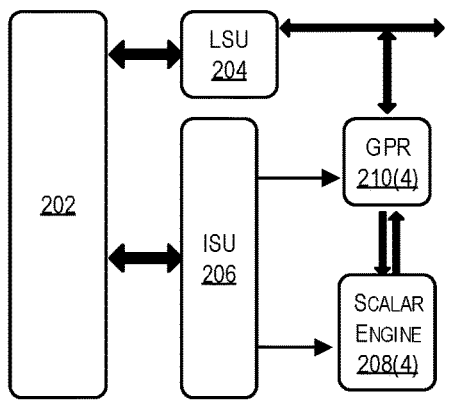
Figure 3B:
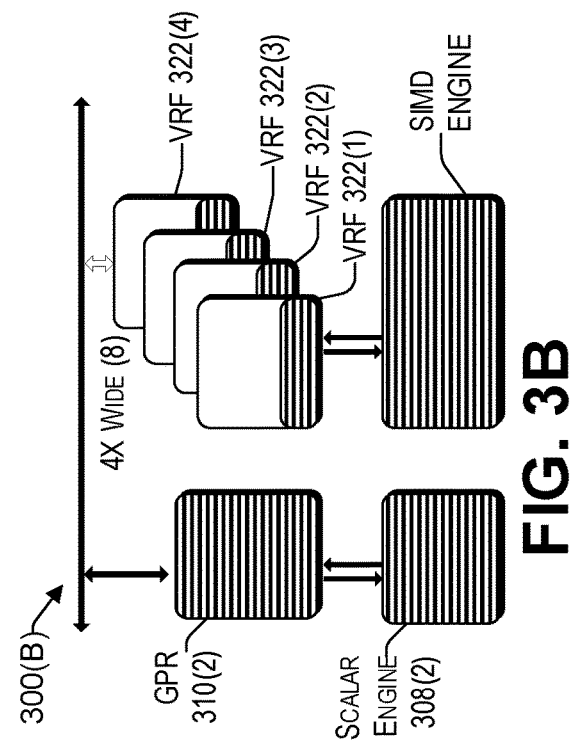
FIGS. 3A to 3D illustrate a fine grain sharing scenario where one thread is configured to be limited to its scalar register file, while the other threads of the processor core can share their vector register files.
Figure 3D:
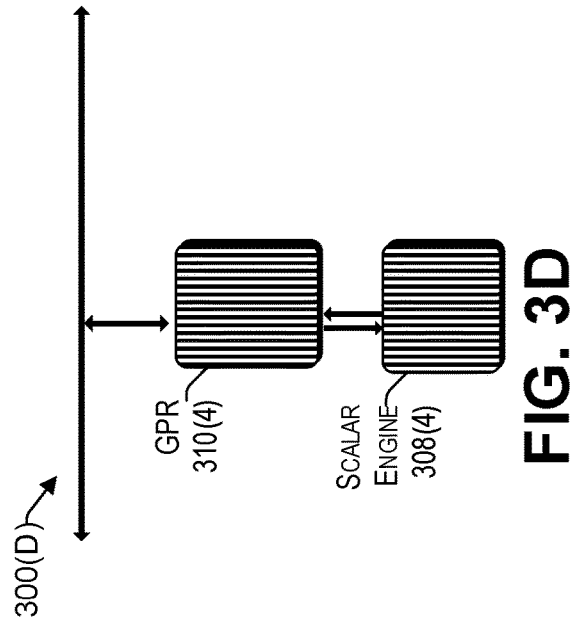
Figure 3A:
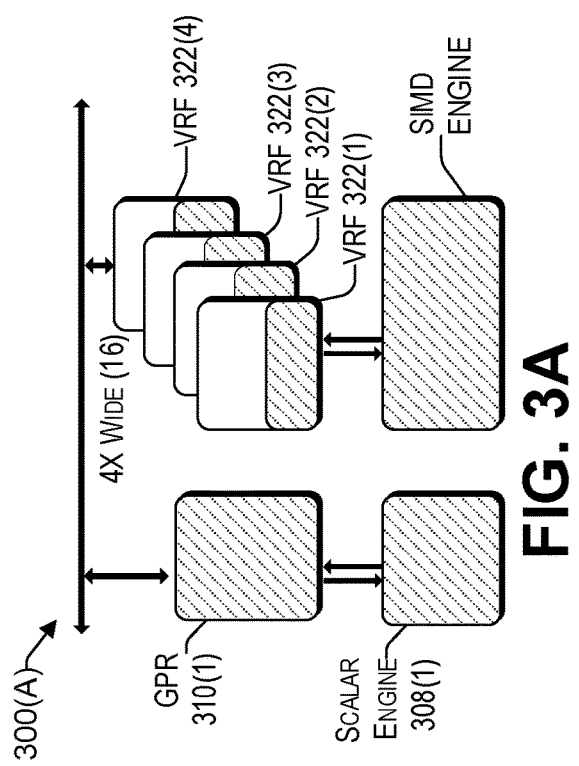
Figure 3C:
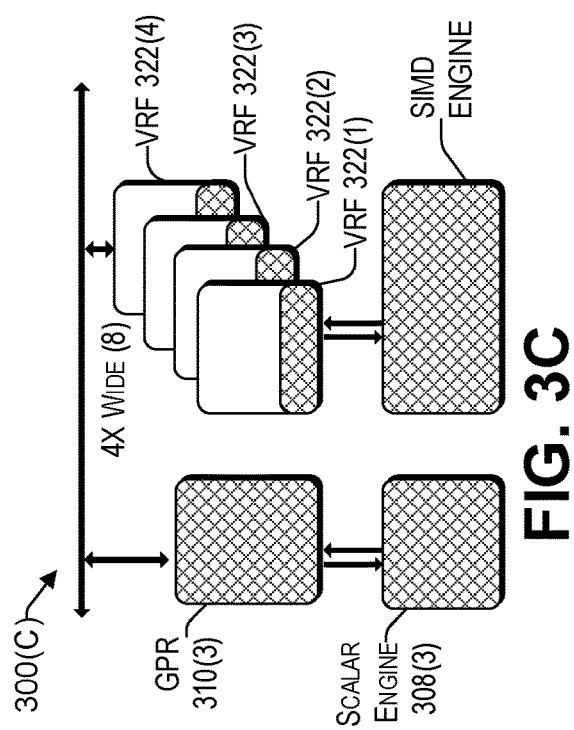

FIGS. 2A to 2D illustrate a sharing scenario where one thread is a borrower thread and the other threads only have scalar registers when in donor mode, consistent with an illustrative embodiment. The sharing scenarios depicted in FIGS. 2A to 2D can be best understood in view of the system of FIG. 1 having four threads, where each thread has its own scalar register file GPR 110 and its own vector register file VRF 122, and where all threads share the storage device 102, the load store unit LSU 104, the controller 106, the scalar execution engines 108(1) to 108(4), and the SIMD execution engines 120(1) to 120(2). As result of a VVECON instruction from a first thread A, the system 100 is reconfigured such that the thread A is a borrower thread borrowing the vector registers from the other three threads. The other three threads (e.g., B to D) are donor threads. The software view for the four threads after the reconfiguration is illustrated in FIGS. 2A to 2D. The four threads still share the storage device 202, the load store unit LSU 204, the controller 206, and the scalar execution engines 208(1-4). However, one of the threads (i.e., the first thread A in the example of FIG. 2A) is configured to be a borrower thread, thereby being able to borrow the VRFs of other threads of the processor core. Stated differently the first thread is configured to be in 4x wide SIMD mode comprising its own vector registers VRF 222(1) and the VRFs 222(2) to 222(4) borrowed from the other threads. This thread A has access to all the SIMD engines 220(1) to 220(4). The donor threads are depicted in FIGS. 2B to 2D where these donor threads are confined to only have scalar registers (i.e., when in donor mode). For example, scalar engine 208(2) is limited to GPR 210(2) of GPR 210(1) to GPR 210(4), as indicated in FIG. 2B; scalar engine 208(3) is limited to GPR 210(3) as indicated in FIG. 2C; and scalar engine 208(4) is limited to GPR 210(4) as indicated in FIG. 2D. Thus, the first thread is 1 X GPR; 4x VRF, whereas the remaining threads 2 to 4 are 1 X GPR.

FIGS. 3A to 3D illustrate a fine grain sharing scenario where one thread is configured to be limited to its scalar register (i.e., GPR 310(4)) when in donor mode, while the other threads of the processor core can share their vector register files and be donor and borrower at the same time. For simplicity and to avoid clutter, the storage device, LSU, and ISU, which are shared by the threads 300(A) to 300(D) are not illustrated. For this example, we assume that the vector register file comprises 32 registers. The threads 300(A) to 300(C) are configured to share the four vector register files VRFs 322(1) to 322(4), such that thread 300(A) gets 16 registers of each of these four VRFs 322(1) to 322(4), thread 300(B) gets another 8 registers of each of these four VRFs 322(1) to 322(4), and thread 300(C) gets the remaining 8 registers of these shared four VRFs 322(1) to 322(4). This means, the first thread, represented by FIG. 3A has one GPR 310(1) and 16 registers of the vector register files VRF 322(1) to 322(4) (i.e., it has 16 vector registers and each is 4x the width of a single VRF). The second thread, represented by FIG. 3B has one GPR 310(2) and 8 registers of the VRFs 322(1) to 322(4) (i.e., 8 vector registers of 4xwidth). The third thread, represented by FIG. 3C has one GPR 310(3) and the remaining 8 registers of the VRFs 322(1) to 322(4) (i.e., 8 vector registers of 4xwidth). The fourth thread, represented by FIG. 3D has only one GPR 310(4) and no vector register file. All four threads have access to the scalar execution engines 308(1) to 308(4), and the threads 300(A) to 300(C) also have access to all the SIMD execution engines. Thus, while the fourth thread can be a donor thread, it is prevented from being a borrower thread.

Figure 4:
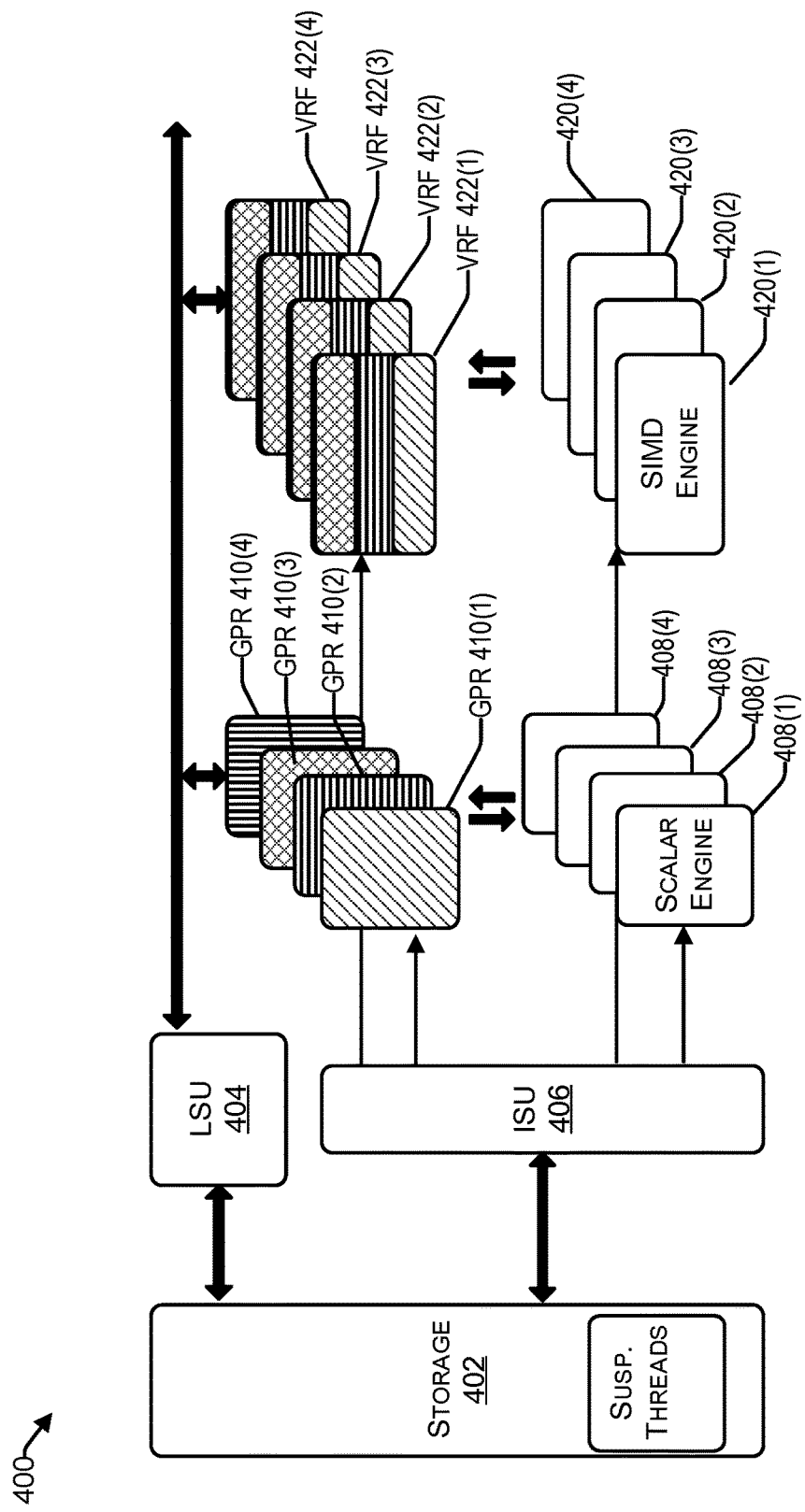
FIG. 4 is a unified hardware view of the fine grain sharing scenario of FIGS. 3A to 3D.

FIG. 4 is a unified hardware view of the fine grain sharing scenario of FIGS. 3A to 3D. As illustrated in FIG. 4, the four threads share the storage device 402, load store unit (LSU) 404, instruction sequencing unit (ISU) 406, the scalar execution engines (e.g., 408(1) to 408(4)) and the SIMD engines 420(1) to 420(4). The first three threads are donor and borrower threads for the vector registers; each of these three threads has its own GPR (i.e., 410(1) to 410(3)) and gets a section of each of the four VRFs 422(1) to 422(4) such that they have a few 4x wide vector registers. The fourth thread is only a donor thread and is restricted to its GPR 410(4) but during this sharing mode has no access to vector registers.

Figure 5:
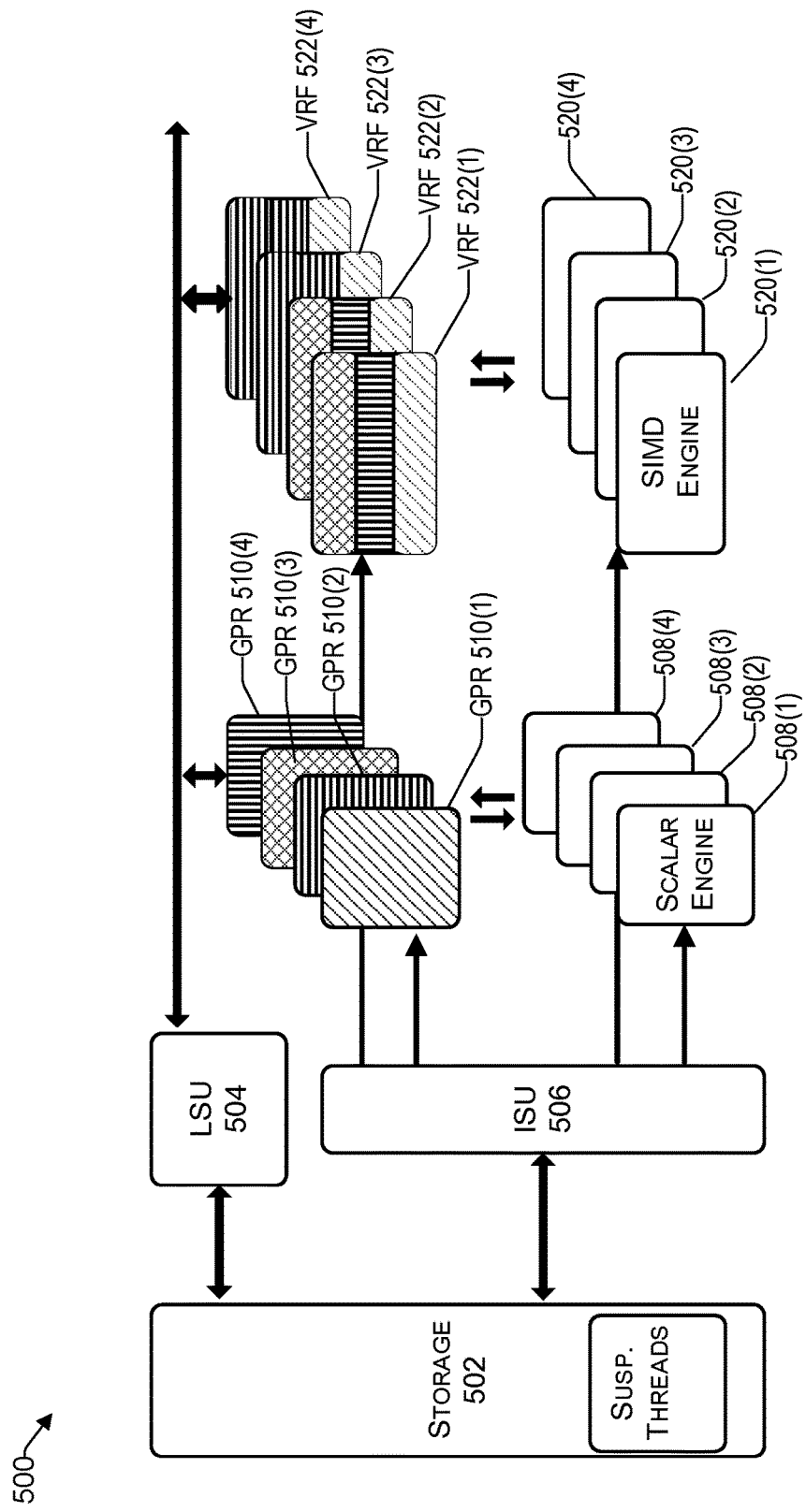
FIG. 5 depicts another vector register file sharing scenario, consistent with an illustrative embodiment.

FIG. 5 depicts another vector register file sharing scenario 500, consistent with an illustrative embodiment. In this embodiment, all four threads are borrower and donor at the same time. And unlike the example in FIG. 4, the threads request different widths of vector registers. The first thread still requests a 4x wide VRF for a few registers (e.g., 16 registers out of the 32 vector registers). The other three threads request a 2x wide VRF for a few registers each (e.g., 16 registers for the second thread, and 8 registers for the third and fourth thread). As in the prior examples, the four threads still share the storage device 502, the LSU 504, the controller 506, the scalar execution engines 508(1) to 508(4), and the SIMD engines 520(1) to 520(4). Each thread still has its own GPR (i.e., 510(1) for thread 1, 510(2) for thread 2, and so on). However, the sharing of the VRF is in a much more elaborate fashion. The first thread gets a few registers of all four VRFs 522(1) to 522(4), the second thread gets a few registers from VRFs 522(1) and 522(2), the third and fourth thread get a few registers from the VRFs 522(3) and 522(4).

The examples of FIGS. 2A to 5 are provided by way of example only, not by way of limitation. Indeed, the different sharing configurations and different number of scalar engines, GPRs, SIMD engines, and VRFs may be used based on the processor core platform. Accordingly, various other sharing permutations may be readily implemented without departing from the scope or spirit of the present disclosure.

Figure 6:
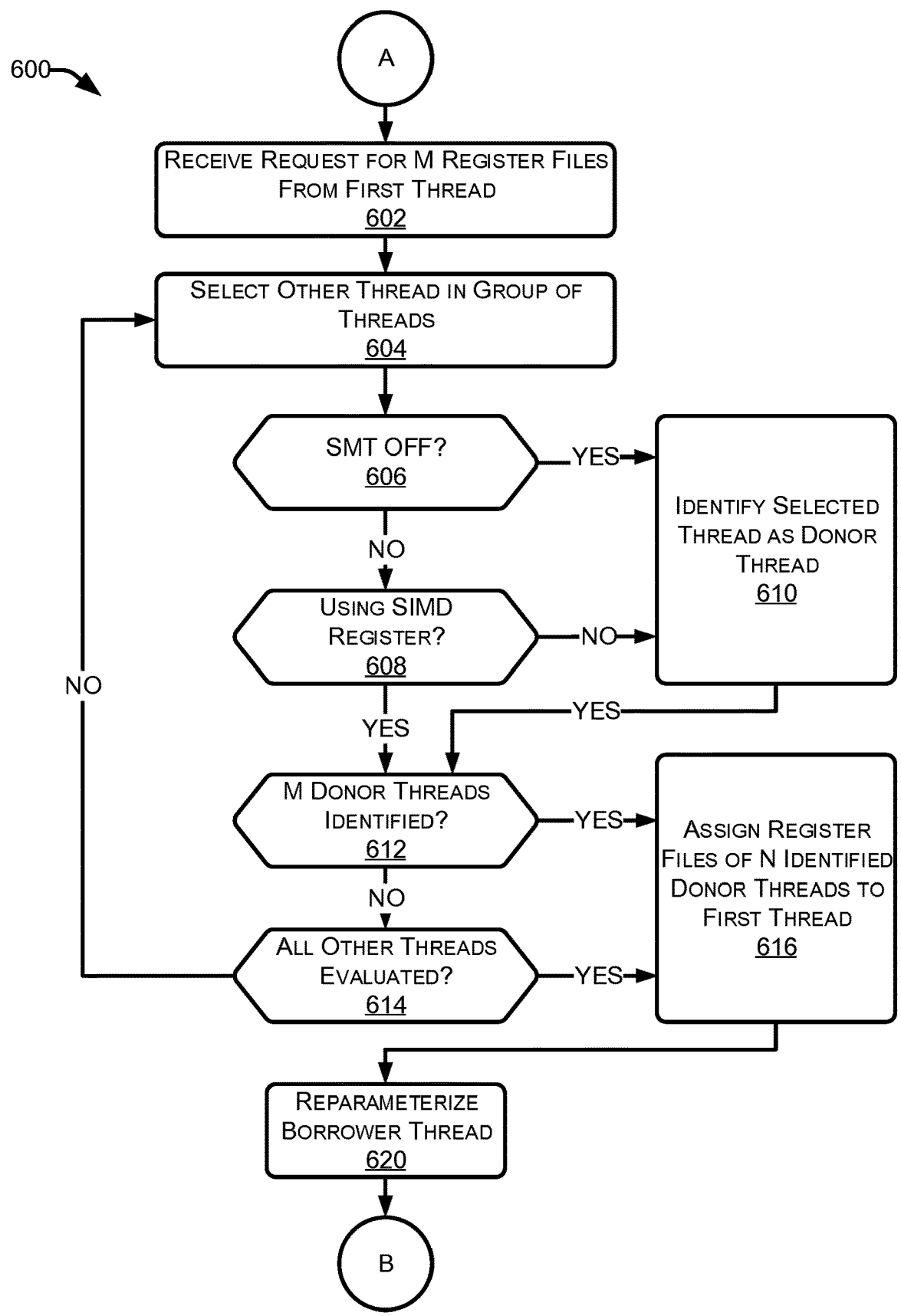
FIG. 6 illustrates an example process of allocating vector registers in a simultaneously-multithreaded processor core.
Figure 7:
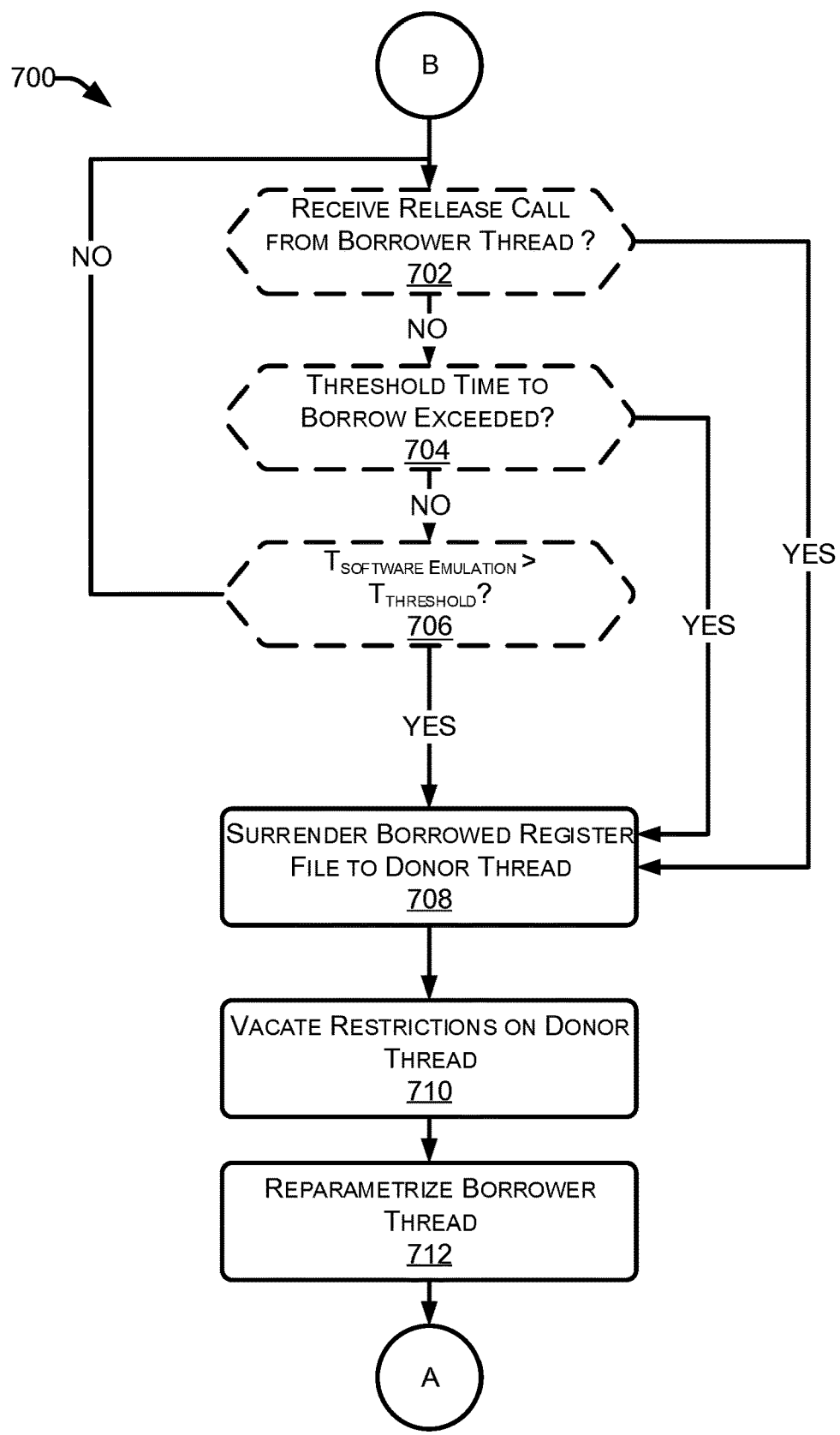
FIG. 7 illustrates an example process of a borrower thread restoring a borrowed thread to a donor thread.

With the foregoing overview of the example architecture 100 and different example configurations 200A to 400, it may be helpful now to consider a high-level discussion of example processes. To that end, FIGS. 6 and 7 present illustrative processes of allocating vector registers in a processor core having multiple threads. Processes 600 and 700 are illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 600 and 700 are described with reference to the architecture 100 of FIG. 1. By way of example only, and not by way of limitation, an SMT4 architecture is assumed, while it will be understood that other architectures are supported as well.

FIG. 6 illustrates an example process of allocating vector registers in a simultaneously-multithreaded processor core. At block 602, a controller receives a request for a number (M) of SIMD vector register files, referred to herein as VRFs, from a first thread, via a system call to the controller. This requestor thread becomes a borrower thread and enters a virtualized mode.

At block 604, the controller selects another SMT thread, from the group of SMT threads available in the CPU of the architecture 100, to determine whether the other thread is available as a donor thread.

A thread may be available as a donor thread in various ways. To that end at block 606, the controller determines whether the SMT mode is presently OFF (i.e., there is no thread active for the given SMT slot) for the other thread. If so (i.e., "YES" at decision block 606), the process continues with block 610 where the selected thread is deemed a donor thread. However, if the SMT mode is not presently OFF (i.e., "NO" at decision block 606), the selected thread can still be used as a donor thread, as discussed below in the context of decision block 608.

At block 608, the controller determines whether the selected thread is presently using its SIMD register. If so (i.e., "NO" at decision block 608), the process continues with block 610, where the selected thread is deemed a donor thread. However, if the selected thread is presently using its SIMD register (i.e., "YES" at decision block 608), the process continues with block 612.

At block 612, the controller determines whether M donor threads that can donate their SIMD vector register files (i.e., VRFs) to the borrower thread have been identified. If so (i.e., "YES" at decision block 612), the process continues with block 616, discussed in more detail below. However, if M donor threads have not been identified (i.e., NO" at decision block 614), the process continues with block 614.

At block 614, the controller determines whether all other threads have been evaluated. If so (i.e., "YES" at decision block 614), the process continues with block 616 where an N number of the selected threads is at least temporarily assigned to the borrower thread, where N≤M. However, if all other threads have not yet been evaluated (i.e., "NO" at decision block 614), the iterative process returns to block 604, where the controller selects another SMT thread, from the group of SMT threads available in the CPU of the architecture 100.

Returning to block 616, upon assigning one or more vector register files of the identified donor threads to the borrower threads, the operating system can limit the donor thread(s) to perform floating point/SIMD operations through a software emulation mode, which does not require its vector register file (i.e., VRF). In other embodiments, one or more of the donor threads are kept idle until the corresponding donated vector register file is returned.

At block 620, the borrower thread is parameterized such that it can take advantage of the N vector register files. The borrower thread can now issue instructions to a wider SIMD register width, which is N times the original width, where N is the number of vector register files made available to the borrower thread by the controller by virtue of the donor threads.

Reference now is made to FIG. 7, which illustrates an example process of a borrower thread restoring a borrowed VRF to a donor thread. In one embodiment, process 700 is performed as a continuation of process 600. The borrower thread can release a borrowed VRF in various ways. By way of example only, and not by way of limitation, several criteria are provided that may act as a trigger event to release a borrowed vector register file to a donor thread. In various embodiments, one or more of these criteria (and additional criteria not illustrated in FIG. 7) may be evaluated.

At block 702, upon completing its operation (e.g., computation), the borrower thread can send a release call to the controller with respect to one or more vector register files that it no longer needs. Accordingly, upon receiving such a release call (i.e., "YES" at decision block 702), the process continues with block 708, discussed in detail below. However, if such a release call is not received by the controller (i.e., "NO" at decision block 702), the process continues with block 704.

At block 704, the controller may monitor the length of time that a borrower thread is in control of a borrowed vector register file. If the threshold time is exceeded, (i.e., "YES" at decision block 704), the process continues with block 708, discussed below. However, if the threshold time is not exceeded, (i.e., "NO" at decision block 704), the process continues with block 706.

At block 706, the controller may monitor the length of time that a donor thread is in software emulation mode. If a threshold time in software emulation mode for the donor thread is exceeded, (i.e., "YES" at decision block 706), the process continues with block 708. However, if the threshold time in software emulation mode for the donor thread is not exceeded, (i.e., "NO" at decision block 706), the process returns to block 702 and the iterative process of identifying a trigger event to release a borrowed thread continues.

At block 708, the controller facilitates the restoration of the borrowed vector register file to the corresponding donor thread. Thus, the donor SIMD engine is in possession of its corresponding vector register file (VRF). In one embodiment, the downgrade of the borrower thread is performed at a time that is deemed safe by the controller (e.g., when the borrowed VRF is not being used by the borrower thread).

At block 710, any restrictions placed on the donor thread are vacated. The donor thread becomes a regular thread that can use its corresponding vector register file or even other vector register files if in virtualized mode.

At block 712, the borrower thread is reparametrized such that it is limited to its own vector register file plus the remaining borrowed vector register files, if any. In one embodiment, the process may return to process 600.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. For example, with reference to process 600, step 608 can be performed in different order, concurrently, or one of the steps can be omitted. In another example, with reference to process 700, steps 702, 704, and 706 can be performed in different order, concurrently, or one or more of these steps can be omitted.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of allocating vector register files in a simultaneously-multithreaded (SMT) processor core, the method comprising:
   receiving, from a borrower thread of the processor core, a request for a first number (M) of the vector register files;
   identifying one or more available donor threads of the processor core;
   assigning a second number (N) of the vector register files, of the identified one or more available donor threads, to the borrower thread, where N is less than or equal to M;
   parameterizing the borrower thread to create a virtualized vector register file for the borrower thread, based on a width of the N vector register files of the identified one or more available donor threads;
   limiting at least one of the one or more available donor threads to software emulation mode;

calculating a time T the limited at least one of the one or more available donor threads operates in the software emulation mode; and
upon determining that the time T exceeds a predetermined threshold, releasing a borrowed vector register file back to its donor thread.

2. The method of claim 1, wherein identifying one or more available donor threads of the processor core comprises:
determining, for each thread other than the borrower thread, whether the thread has at least one of the following properties:
an SMT mode OFF; and
not using its vector register file.

3. The method of claim 1, wherein the vector register files are single instruction, multiple data (SIMD) type.

4. The method of claim 1, wherein the software emulation mode comprises performing floating-point operations that do not involve a vector register file.

5. The method of claim 1, further comprising, for each of the one or more available donor threads:
entering the donor thread into a scalar-only mode; and
maintaining the scalar-only mode until the borrower thread completes its operation.

6. The method of claim 1, further comprising reducing a number of vector register files of the identified one or more available donor threads assigned to the borrower thread before the borrower thread completes its operation.

7. The method of claim 1, further comprising, upon determining that a given donor thread is attempting to access its vector register file:
keeping the given donor thread suspended;
forcing the given donor thread into the software emulation mode; or
suspending the borrower thread.

8. The method of claim 1, further comprising, upon determining that a given donor thread is attempting to access its vector register file:
determining a priority of the borrower thread;
determining a priority of the given donor thread;
upon determining that the priority of the given donor thread is higher than the priority of the borrower thread, restoring a borrowed vector register file to the given donor thread; and
upon determining that the priority of the given donor thread is the same or lower than the borrower thread, forcing the given donor thread into the software emulation mode.

9. The method of claim 1, wherein identifying one or more available donor threads of the processor core comprises identifying one or more donor threads that have a priority that is lower than a priority of the borrower thread.

10. The method of claim 1, wherein identifying one or more available donor threads of the processor core comprises identifying one or more donor threads that have a computation load that is lower than a computational load of the borrower thread.

11. The method of claim 1, further comprising restoring the borrowed vector register file to its donor thread upon receiving a release call from the borrower thread with respect to the borrowed vector register file.

12. The method of claim 11, further comprising re-parameterizing the borrower thread to create an updated virtualized vector register file, based on a width of the vector register files, that does not include the restored vector register file.

13. The method of claim 1, wherein at least one of the M requested vector register files is for a number (K) of vector registers of a total of L vector registers of the at least one of the M requested vector register files, where K<L.

14. A simultaneously-multithreaded (SMT) processor core, comprising:
a plurality of threads;
a vector register file assigned to each thread; and
a controller circuit configured to:
receive, from a borrower thread of the plurality of threads, a request for a first number (M) of the vector register files;
identify one or more available donor threads of the plurality of threads;
assign a second number (N) of the vector register files, of the identified one or more available donor threads, to the borrower thread, where N is less than or equal to M;
parameterize the borrower thread to create a virtualized vector register file for the borrower thread, based on a width of the N vector register files of the identified one or more available donor threads; and
upon determining that a given donor thread is attempting to access its vector register file:
keep the given donor thread suspended;
force the given donor thread into a software emulation mode; or
suspend the borrower thread.

15. The processor core of claim 14, wherein the controller circuit identifying one or more available donor threads comprises:
determining, for each thread other than the borrower thread, whether the thread has at least one of the following properties:
an SMT mode OFF; and
not using its vector register file.

16. The processor core of claim 14, wherein the controller circuit is further configured to, for each donor thread:
limit the donor thread to the software emulation mode, wherein the software emulation mode comprises performing floating-point operations that do not involve a vector register file;
calculate a time T the donor thread operates in the software emulation mode; and
upon determining that the time T exceeds a predetermined threshold, release a vector register file back to the donor thread.

17. The processor core of claim 14, wherein the controller circuit is further configured to, for each of the one or more available donor threads:
enter the donor thread into a scalar-only mode; and
maintain the scalar-only mode until the borrower thread completes its operation.

18. A method comprising:
receiving, from a borrower thread of a processor core, a request for a first number (M) of vector register files;
identifying one or more available donor threads of the processor core;
assigning a second number (N) of the vector register files, of the identified one or more available donor threads, to the borrower thread, where N is less than or equal to M;
parameterizing the borrower thread to create a virtualized vector register file for the borrower thread, based on a width of the N vector register files of the identified one or more available donor threads; and
for each of the one or more available donor threads:
entering the donor thread into a scalar-only mode; and maintaining the scalar-only mode until the borrower thread completes its operation.

* * * * *